Dec. 3, 1968   A. J. HENQUET   3,414,796
MAGNETICALLY CONTROLLED BATTERY CHARGE AND DISCHARGE CIRCUIT
Filed Nov. 23, 1966

Inventor
ANDRE J. HENQUET
By Gordon H. Olson
Attorney

3,414,796
MAGNETICALLY CONTROLLED BATTERY CHARGE AND DISCHARGE CIRCUIT
Andre Jean Henquet, Boulogne, Hauts-de-Seine, France, assignor to International Standard Electric Corporation, New York, N.Y., a corporation of Delaware
Filed Nov. 23, 1966, Ser. No. 596,586
10 Claims. (Cl. 320—14)

The present invention relates to electrical control devices in which the control necessarily comprises a phase of removal of two parts of the device.

This control can be for example the setting into operation of an apparatus, or of a tool, that must necessarily be displaced starting from a rest position in order to make use of it, or else again the start of one or several operations that must necessarily follow another opeartion, for example for the purposes of signalling, or for security purposes as for the passage of a mobile or for the opening of a gate or of a barrier, etc.

This control is generally associated with at least two circuits one of which expresses the rest state, and the other the working state of the device.

These two circuits each comprise at least one switch. The switches of the "rest" and "work" circuits ought to be closed and open respectively when the device is in the rest state, while these same switches ought to be open and closed respectively in the working state.

The managing of these two switches is often carried out by hand. Sometimes it is obtained by means of complicated relatively burdensome devices.

The present invention allows these inconveniences to be remedied and has for its object a new control device in which the switches are of the type with contact arms in the form of ferromagnetic reeds or laminae, preferably sealed in a hermetic envelope and are placed from the start of the control, in the neighborhood of a permanent magnet. The reluctances of the magnetic circuits formed by the reeds or laminae of the switches with the permanent magnet, have very different values.

The switch whose reeds or laminae form with the permanent magnet a magnetic circuit presenting the strongest reluctance, is placed as a fixture in the neighborhood of the magnet.

The different modes of the invention differ essentially from one another by the nature of the reeds or laminae constituting the switches and by their position in relation to the permanent magnet.

According to a preferred mode of the invention, the inherent magnetic reluctances of the reeds or laminae of the switches are equal, the movable switch in relation to the magnet being capable of being placed nearer to the magnet than is the other switch, in order to form a shorter magnetic circuit.

According to another mode of the invention, the inherent reluctance of the reeds or laminae of the switch placed in fixed position in the neighborhood of the magnet, is greater than that of the other switch, the magnetic circuits corresponding to the two switches being substantially equal.

Other characteristics of the invention will emerge from the detailed description below taken with reference to the accompanying drawings. It is well understood that the description and drawings are given only in an indicative and not limiting scope of the invention.

To illustrate the invention, the control device is shown as a telephone set with a cordless handset. Although this example of application is particularly interesting it is useful to recall that this example of application is in no way limiting.

Figure 1:
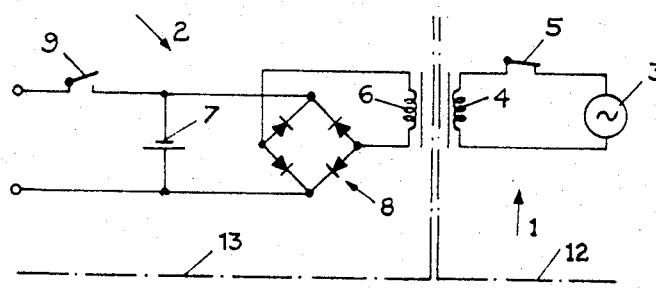
FIGURE 1 shows the electric diagram of two associated circuits capable of using a control device according to the invention.

The installation of the set, such as shown in FIGURE 1 comprises a rest circuit 1 and a working circuit 2. The rest circuit includes a source of alternating current energy feeding the primary 4 of a transformer by the intermediary of a switch 5 represented in closed position.

The working circuit 2 comprises the secondary winding 6 of the transformer recharging a battery 7 through the intermediary of a rectifier bridge 8. The battery 7 feeds the transmitter-receiver of the handset through a switch 9 identical with the switch 5 only shown in open position.

Figure 2:
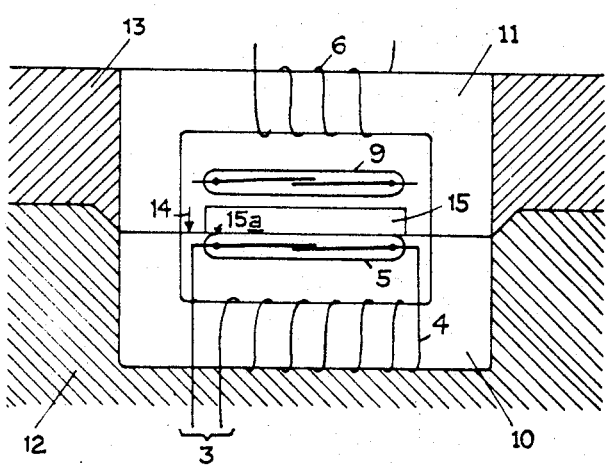
FIGURE 2 shows schematically an example of a control device incorporating the invention, in the resting state.

FIGURE 2 diagrammatically shows part of the circuit of FIGURE 1 in the form of a telephone including the primary winding 4, the switch 5, the secondary winding 6 and the second switch 9. The magnetic circuit of the transformer is divided into two joined parts 10 and 11 in the form of a U, fixed with the base 12 and the handset 13 of a telephone respectively. The primary winding 4 is wound on the part 10 while the secondary winding is wound on the part 11.

The switch 5 is placed between the ends of the branches of the part 10, parallel to the plane of separation 14 of the two parts of the magnetic circuit of the transformer, and is disposed in such manner that its envelope just abuts on the plane 14.

The switch 9 is shown between the ends of the branches of the part 11 of the magnetic circuit of the transformer, at a short distance from a permanent magnet 15. The switch 9 and the permanent magnet 15 are both parallel to the plane of separation 14 of the two parts of the magnetic circuit of the transformer, and the permanent magnet 15 is placed in such manner that its external face abuts on the plane of separation 14.

When the handset 13 is placed on its base as shown in FIGURE 2, the control device is in a state of rest. The switches 5 and 9 are then disposed on one part or other of the permanent magnet 15. The magnet flux created by the magnet 15 tends to be closed simultaneously by the laminae of the switches 5 and 9, according to the paths of different length. The path corresponding to the switch 5 is less than that corresponding to the switch 9. On the other hand, the inherent reluctances of the contact arms or laminae of the switches 5 and 9 are equal. It results that the contact arms or the laminae of the switch 5 form a sort of magnetic short circuit, these laminae magnetize and the switch 5 closes. On the other hand, the laminae of the switch 9 separate under the effect of their own elasticity and the switch 9 opens. This is the position shown in FIGURE 2.

Figure 3:
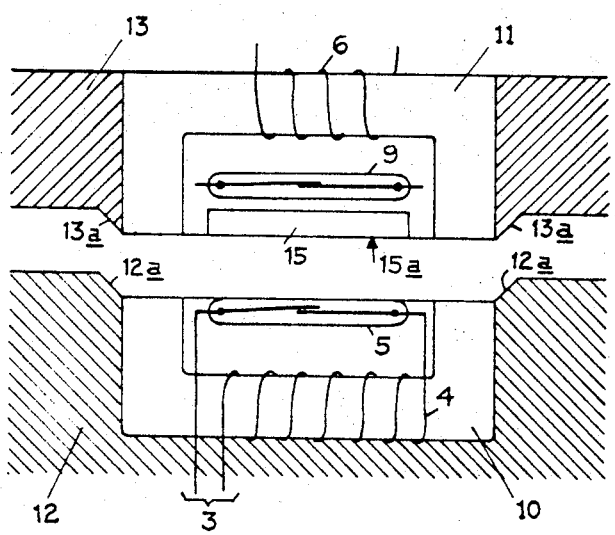
FIGURE 3 shows the same control device in the working state.

When the handset is moved away from its base, the path of the lines of flux that must pass through the laminae of the switch 5 increases. The reluctance of the corresponding magnetic circuit increases, and starting with a certain distance of the handset from its base, the reluctance of this circuit becomes very much greater than that of the circuit going through the switch 9. The laminae of this switch are magnetized and the switch 9 is closed while the switch 5 opens. This is the position shown in FIGURE 3.

Thus, with the example of application here chosen, the battery 7 mounted in the handset 13 is recharged when the handset is placed on the base (switch 5 closed, switch 9 open) and feeds the transmitter-receiver of the handset when the latter is lifted from its support (switch 5 open, switch 9 closed).

The same control device can be obtained, it is to be understood, by providing switch 9 with an inherent reluctance very much greater than that of switch 5, and in disposing this new switch at the same distance from the permanent magnet 15 as is the switch 5 when the device is in the resting state. The operation of this new device is, it is to be understood, identical with that previously described.

In order to facilitate the operation of the device, and more particularly in order to dispose the switches 5 and 9 always in the same position in relation to the magnet 15, the facing surfaces of the base 12 and of the handset comprising respectively the two parts 12a and 13a, for example conical, encasing one in the other for centering purposes.

The invention is not limited to the sole examples described and represented; it covers on the contrary all variants which concern, particularly the nature of the laminae or reeds of the switches, their form, the position of the switches in relation to the magnet, the nature of the application that can be made of the control device, and the number of switches that it comprises.

In fact, without departing from the scope of the invention, a multiple control device can be realized comprising several switches 5, several switches 9 associated by means of one or of several magnets 15, the number of switches 5 being able to be different from the number of switches 9.

Although the principles of the present invention have been described above in relation to particular examples, it will be clearly understood that the scope of the invention is not limited to such examples.

What is claimed is:

1. In an electrical control device: a first circuit including a first magnetically controllable switch; a second circuit including a second magnetically controllable switch; a permanent magnet mounted to control the operation of said switches; said switches and said magnet being mounted in a manner to permit relative movement between one of said switches with respect to said magnet and having one position wherein both of said switches are located near said permanent magnet with said first switch being closed and said second switch being open, and having a second position wherein one of said switches is spaced remotely from said permanent magnet with the result that said first switch is open and said second switch is closed.

2. The device of claim 1 wherein said first circuit includes the primary winding of a transformer located near said first switch; and said second circuit includes the secondary winding of said transformer located near said second switch.

3. The device of claim 1 wherein said permanent magnet and said secondary winding and switch are mounted for movement away from said first primary winding and said first switch.

4. The device of claim 2 including a first U-shaped core upon which is mounted said primary winding; and a second U-shaped core upon which is mounted said secondary winding, said cores being mounted in a manner such that in said one position said windings are in flux linking relation and in said second position said second core is spaced from said first core.

5. The device of claim 4 wherein said switches are normally open and are closeable by said magnet:

6. The device of claim 5 wherein said magnet is mounted in fixed slightly spaced relation with said second switch and is movable closer to said first switch than the magnet is to said second switch.

7. An automatic switching means in combination with a battery operated device and a battery recharger circuit comprising: a primary winding of a transformer adapted to be connected to a source of power; a secondary winding for said transformer being movable into and out of flux linking relation with said primary winding; a rechargeable battery connected to said secondary winding through suitable rectifier means; a magnetically controllable switch connected to said battery for controlling current flow from the battery, said switch being located near and movably mounted with said secondary winding; and a permanent magnet mounted to control operation of said switch so that when said coils are in flux linking relation said switch is open and when said primary coil is moved out of flux linking relation said switch is opened.

8. The combination of claim 7 including a magnetically controllable switch connected to said primary winding, said primary switch being mounted near said primary winding and with respect to said magnet such that the primary switch is closed when said coils are in flux linking relation and open when said coils are out of flux linking relation.

9. The combination of claim 8 wherein said permanent magnet is located near and mounted for movement with said secondary winding and said secondary switch, said magnet causing said primary switch to close when said coils are in flux linking relation and causing said secondary switch to close when said coils are not in flux linking relation.

10. The combination of claim 9 wherein said coils are adapted to physically mate; and said primary switch and said magnet are located at the interface between the two transformer components, said secondary switch being in spaced fixed relation with said magnet so that the magnetic path from said magnet is through the primary switch when said coils are in flux linking relation and the magnetic path is through said secondary switch when said coils are not in flux linking relation.

References Cited

UNITED STATES PATENTS

| | | | |
|---|---|---|---|
| 3,195,540 | 7/1965 | Waller | 128—422 |
| 3,239,626 | 3/1966 | Pearse | 325—153 |
| 3,264,425 | 8/1966 | Hosokawa et al. | 335—153 |
| 3,273,088 | 9/1966 | Grobe et al. | 335—153 |
| 3,277,358 | 10/1966 | Nicholl | 320—2 |
| 3,277,414 | 10/1966 | Piccininni | 335—153 |
| 3,369,164 | 2/1968 | Ball | 320—55 |

LEE T. HIX, *Primary Examiner.*

S. WEINBERG, *Assistant Examiner.*